United States Patent
Wu (10) Patent No.: US 12,171,006 B2
(45) Date of Patent: Dec. 17, 2024

(54) PHYSICAL UPLINK CONTROL CHANNEL (PUCCH) TRANSMISSION METHOD, AND RELATED APPARATUS

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 366 days.

(21) Appl. No.: 17/689,474

(22) Filed: Mar. 8, 2022

(65) Prior Publication Data

US 2022/0191861 A1 Jun. 16, 2022

Related U.S. Application Data

(63) Continuation of application No. PCT/CN2019/116870, filed on Nov. 8, 2019.

(51) Int. Cl.
| | |
|---|---|
| H04W 72/21 | (2023.01) |
| H04J 13/00 | (2011.01) |
| H04W 72/044 | (2023.01) |
| H04W 76/20 | (2018.01) |

(52) U.S. Cl.
CPC ........... *H04W 72/21* (2023.01); *H04J 13/004* (2013.01); *H04W 72/0466* (2013.01); *H04W 76/20* (2018.02)

(58) Field of Classification Search
CPC ..... H04W 72/21; H04W 72/23; H04W 76/20; H04J 13/004; H04L 1/1614; H04L 1/1812; H04L 1/1685; H04L 1/1671; H04L 1/1854

USPC .......................................................... 370/329
See application file for complete search history.

(56) References Cited

U.S. PATENT DOCUMENTS

| | | | |
|---|---|---|---|
| 11,974,136 B2* | 4/2024 | Bhattad | H04W 72/21 |
| 11,974,283 B2* | 4/2024 | Saggar | H04L 1/0025 |
| 2019/0124689 A1* | 4/2019 | Yang | H04L 5/001 |
| 2019/0274187 A1 | 9/2019 | Urabayashi et al. | |
| 2020/0236708 A1* | 7/2020 | Li | H04W 72/23 |
| 2020/0403751 A1* | 12/2020 | Baldemair | H04L 5/0055 |

(Continued)

FOREIGN PATENT DOCUMENTS

| | | |
|---|---|---|
| CN | 107113076 A | 8/2017 |
| CN | 109257150 A | 1/2019 |
| WO | 2021066593 A1 | 4/2021 |

OTHER PUBLICATIONS

International Search Report Mailed Aug. 13, 2020 In Application No. PCT/CN2019/116870, 4 pages.

(Continued)

*Primary Examiner* — Jean A Gelin
(74) *Attorney, Agent, or Firm* — PERKINS COIE LLP (57) ABSTRACT

Disclosed are a PUCCH transmission method, and a related apparatus. The method comprises: a terminal determining a target interlace from at least two interlaces, wherein the at least two interlaces are resources configured for the terminal for a PUCCH transmission; and the terminal performing a PUCCH transmission according to the target interlace. In an embodiment of the present invention, a target interlace is determined from at least two interlaces to realize an interlace-based PUCCH transmission.

8 Claims, 3 Drawing Sheets

```
┌─────────────────────────────────────────────────┐
│ A terminal determines a target interlace from   │ 301
│ at least two interlaces, wherein the at least   │
│ two interlaces are resources configured for     │
│ the terminal for PUCCH transmission             │
└─────────────────────────────────────────────────┘
                        │
                        ▼
┌─────────────────────────────────────────────────┐
│ The terminal performs PUCCH transmission        │ 302
│ according to the target interlace               │
└─────────────────────────────────────────────────┘
```

(56) References Cited

U.S. PATENT DOCUMENTS

| | | | | |
|---|---|---|---|---|
| 2021/0029731 A1* | 1/2021 | Kundu | ................ | H04W 74/004 |
| 2021/0211343 A1* | 7/2021 | Baldemair | ........ | H04W 72/1263 |
| 2023/0354341 A1* | 11/2023 | Huang | ................ | H04W 72/231 |
| 2024/0031070 A1* | 1/2024 | Jung | ................... | H04W 72/232 |
| 2024/0048330 A1* | 2/2024 | Li | ......................... | H04L 5/0094 |
| 2024/0106611 A1* | 3/2024 | Wang | ................... | H04L 5/0091 |

OTHER PUBLICATIONS

Huawei, HiSilicon, UL channels and signals in NR unlicensed band, 3GPP TSG RAN WG1 Meeting #98bis, R1-1910044, Chongqing, China, Oct. 14-20, 2019, 15 pages.

Vivo, Discussion on physical UL channel design in unlicensed spectrum, 3GPP TSG RAN WG1 #98bis, R1-1910203 Chongqing, China, Oct. 14-20, 2019, 7 pages.

Samsung, Uplink signal and channel design for NR-U, 3GPP TSG-RAN WG1 Meeting #98bis, R1-1910458, Chongqing, China, Oct. 14-Oct. 20, 2019, 7 pages.

Ericsson "Feature lead summary 2 for UL Signals and Channels" R1-1911562; 3GPP TSG RAN WG1 Meeting #98b; Chongqing, China; Aug. 14-20, 2019. 29 pages.

Extended European Search Report for European Application No. 19951968.7 issued Jul. 21, 2022. 8 pages.

Qualcomm Inc. "Summary of NR-U agreements till RAN1 #98" R1-1911721; 3GPP TSG RAN WG1 Meeting #99; Reno, USA; Nov. 18-22, 2019. 26 pages.

\* cited by examiner

PHYSICAL UPLINK CONTROL CHANNEL (PUCCH) TRANSMISSION METHOD, AND RELATED APPARATUS

CROSS-REFERENCE TO RELATED APPLICATION

The present application is a continuation application of International PCT Application No. PCT/CN2019/116870, filed on Nov. 8, 2019, the entire content of which is hereby incorporated by reference.

TECHNICAL FIELD

The present application relates to the field of communication technologies, in particular to a Physical Uplink Control Channel (PUCCH) transmission method and related devices.

BACKGROUND

At present, there are some scenarios where an interlace needs to be used for Physical Uplink Control Channel (PUCCH) transmission, that is, in uplink data channel transmission in some systems, a basic unit of uplink resource allocation has an interlace structure to increase a channel occupancy rate, etc. Therefore, how a terminal achieves interlace-based PUCCH transmission has become a research hotspot.

SUMMARY

Embodiments of the present application provide a Physical Uplink Control Channel (PUCCH) transmission method and related devices, which can achieve PUCCH transmission based on a target interlace by determining the target interlace from at least two interlaces.

In a first aspect, an embodiment of the present application provides a PUCCH transmission method, including: determining, by a terminal, a target interlace from at least two interlaces, wherein the at least two interlaces are resources configured for the terminal for PUCCH transmission; and performing, by the terminal, PUCCH transmission according to the target interlace.

In a second aspect, an embodiment of the present application further provides a PUCCH transmission method, including: configuring, by a network device, at least two interlaces for a terminal, wherein the at least two interlace are resources configured for the terminal for PUCCH transmission; and indicating, by the network device, the at least two interlaces to the terminal to enable the terminal to perform PUCCH transmission based on a target interlace determined through the at least two interlaces.

In a third aspect, an embodiment of the present application provides a terminal which has some or all functions to achieve behaviors of the terminal in the above method. For example, the terminal may have some or all of the functions in the embodiments of the present application, or it may have functions of independently implementing any of the embodiments. The functions may be implemented by hardware, or may be implemented by hardware executing corresponding software. The hardware or software may include one or more units (or modules) corresponding to the above functions.

In a possible design, the terminal may include a processing unit and a communication unit. The processing unit is configured to support the terminal to execute corresponding functions in the above methods. The communication unit is configured to support communication between the terminal and another device (such as a network device). The terminal may further include a storage unit. The storage unit is coupled to the processing unit, and is configured to store essential program instructions, data, and etc. of the terminal. Optionally, the processing unit may be a processor, the communication unit may be a transceiver or a communication interface, and the storage unit may be a memory.

In a fourth aspect, an embodiment of the present application provides a network device which has some or all functions to achieve behaviors of the network device in the above method. For example, the network device may have some or all of the functions in the embodiments of the present application, or it may have functions of independently implementing any of the embodiments. The functions may be implemented by hardware, or may be implemented by hardware executing corresponding software. The hardware or software may include one or more units (or modules) corresponding to the above functions.

In a possible design, the network device may include a processing unit and a communication unit. The processing unit is configured to support the network device to execute corresponding functions in the above methods. The communication unit may be configured to support communication between the network device and another device (such as a terminal). The network device may further include a storage unit. The storage unit is coupled to the processing unit, and is configured to store essential program instructions, data, and etc. of the network device. Optionally, the processing unit may be a processor, the communication unit may be a transceiver or a communication interface, and the storage unit may be a memory.

In a fifth aspect, an embodiment of the present application provides a terminal. The terminal includes a processor, a memory, a communication interface, and one or more programs, wherein the one or more programs are stored in the memory and configured to be executed by the processor, and the program includes instructions for executing acts in any method of the first aspect of the embodiments of the present application.

In a sixth aspect, an embodiment of the present application provides a network device. The network device includes a processor, a memory, a communication interface, and one or more programs, wherein the one or more programs are stored in the memory and configured to be executed by the processor, and the one or more programs include instructions for executing acts in any method of the second aspect of the embodiments of the present application.

In a seventh aspect, an embodiment of the present application provides a communication system, including the terminal and/or network device of the above aspects. In a possible design, the system may further include another device, such as another device that interacts with the terminal or network device.

In an eighth aspect, an embodiment of the present application provides a computer-readable storage medium. The computer-readable storage medium stores computer programs enabling a computer to execute all or part of acts as described in the method of the first aspect of the embodiments of the present application.

In a ninth aspect, an embodiment of the present application provides a computer-readable storage medium. The computer-readable storage medium stores computer programs enabling a computer to execute all or part of acts as described in the method of the second aspect of the embodiments of the present application.

In a tenth aspect, an embodiment of the present application provides a computer program product. The computer program product includes a non-transitory computer-readable medium storing a computer program. The computer program is operable to enable a computer to execute all or part of acts as described in the method of the first aspect of the embodiments of the present application. For example, the computer program product may be a software installation package.

In an eleventh aspect, an embodiment of the present application provides a computer program product. The computer program product includes a non-transitory computer-readable medium storing a computer program. The computer program is operable to enable a computer to execute all or part of acts as described in the method of the second aspect of the embodiments of the present application. For example, the computer program product may be a software installation package.

In the solutions provided by the embodiments of the present application, the terminal can determine a target interlace from at least two interlaces configured for the terminal for PUCCH transmission, and perform PUCCH transmission according to the target interlace, thereby achieving interlace-based PUCCH transmission.

BRIEF DESCRIPTION OF DRAWINGS

Hereinafter, drawings needed to be used in the description of the embodiments or the prior art will be introduced.

DETAILED DESCRIPTION

Technical solutions in embodiments of the present application will be described below in combination with the accompanying drawings.

It may be understood that the technical solutions of the present application may be specifically applied to various communication systems, such as the 5th Generation (5G) system, a New Radio Unlicensed (NR-U) system, a Long Term Evolution (LTE) system such as a Licensed-Assisted Access-LTE (LAA-LTE) system.

Figure 1:
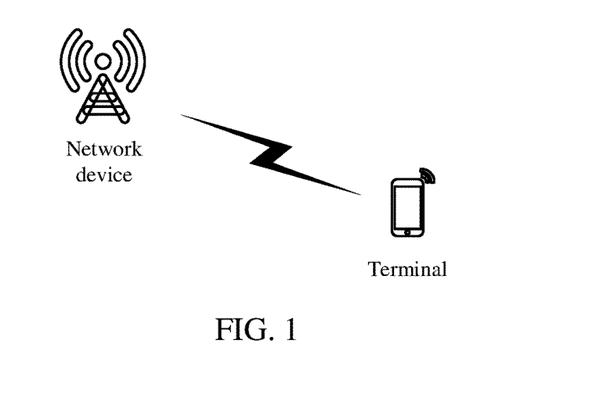
FIG. 1 is a diagram of architecture of a communication system according to an embodiment of the present application.

Referring to FIG. 1, which is a diagram of architecture of a communication system according to the present application. As shown in FIG. 1, the communication system may include one or more network devices 101 and one or more terminals 102. In FIG. 1, only one network device 101 and one terminal 102 are shown. Data transmission may be performed between the network device 101 and the terminal 102, for example, data transmission such as interlace-based PUCCH transmission.

Herein, interlace may be called comb tooth, comb or other names. In the embodiment of the present application, interlace is taken as an example for explanation.

In the present application, the network device may be an entity on a network side for sending or receiving information, such as a base station, which may be used for communicating with one or more terminals or one or more base stations with partial terminal functions (for example, communication between a macro base station and a micro base station, such as an access point). The base station may be a Base Transceiver Station (BTS) in a Time Division Synchronous Code Division Multiple Access (TD-SCDMA) system, or it may an Evolutional Node B (eNB) in a Long Term Evolution (LTE) system, or it may be a base station gNB in a 5G system or a New Radio (NR) system, and so on, which are not all listed here. Or, the network device 101 may also be a Transmission Point (TP), an Access Point (AP), a Transmission and Receiver Point (TRP), a relay device, a Central Unit (CU), or another network device with a base station function, which is not limited in the present application.

In the present application, the terminal is a device with communication function, such as a vehicle-mounted device, a wearable device, and a handheld device (such as a smart phone). The terminal may also be called other names, such as User Equipment (UE), user unit, mobile station, mobile unit, terminal device, etc., which is not limited in the present application.

Take the communication system being an NR-U system as an example. The NR system may work in an unlicensed spectrum (or called an unlicensed frequency band, etc.), for example, work in a carrier aggregation scene, a dual-connectivity scene, a standalone scene, an NR single cell scene, etc. The unlicensed spectrum is a spectrum divided by countries and regions that may be used for communication of communication devices such as the above-mentioned network devices and terminals. Compared with a licensed spectrum, the unlicensed spectrum may be considered as a shared spectrum, that is, communication devices in different communication systems may use the unlicensed spectrum without applying for an exclusive spectrum license from a government, as long as they meet a regulatory requirement on the unlicensed spectrum set by the countries or the regions. When a working band of NR-U is the unlicensed spectrum, fairness with another system such as a Wireless Fidelity (WiFi) system that has been working on the unlicensed spectrum, needs to be ensured, that is, it is ensured that various communication systems that use the unlicensed spectrum for wireless communication can coexist friendly on this spectrum. For example, a system may use a Listen Before Talk (LBT) mechanism for data transmission. A communication device follows the LBT principle and listens to whether a channel is idle before sending a signal on the channel of an unlicensed spectrum. The communication device may send a signal only when the channel is idle. If the listening result is that the channel is busy, the communication device cannot send a signal. When sending a signal, that is, when communication devices in a communication system are performing communication, there may be a scene where an interlace needs to be used for uplink transmission such as PUCCH transmission. Herein, a frequency domain resource of one interlace may be 10 or 11 Physical Resource Blocks (PRBs), etc.

Figure 2A:
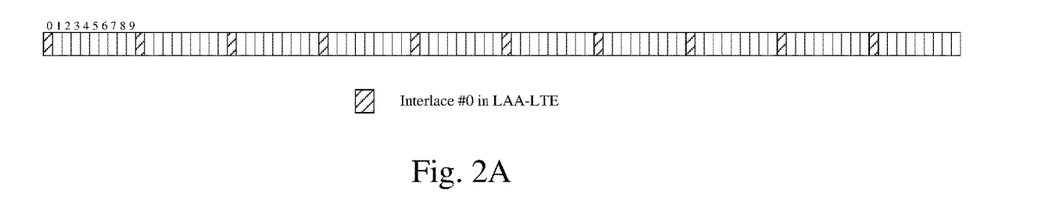
FIG. 2A is a schematic diagram of an interlace structure according to an embodiment of the present application.

For example, due to a limitation of a maximum power spectral density when sending a signal on an unlicensed spectrum (that is, a power of a signal transmitted on per MHz bandwidth cannot exceed a value), in uplink data channel transmission in an LAA-LTE system, in order to meet requirements of a signal at least occupying a specified index of a channel bandwidth, such as occupying 80% of the index, and maximizing a transmission power of an uplink signal, etc. when a terminal device transmits uplink data, a basic unit of uplink resource allocation has an interlace structure. Referring to FIG. 2A, which is a schematic diagram of an interlace structure according to an embodiment of the present application. As shown in FIG. 2A, in an LTE system, when a channel bandwidth is 20 MHz, a system includes 100 Resource Blocks (RBs), which are divided into 10 interlaces (namely interlace #0 to interlace #9, or called interlace 0 to interlace 9), wherein each interlace includes 10 RBs, and any two adjacent RBs in the 10 RBs are equally spaced in a frequency domain. For example, RBs included in interlace #0 is RB 0, 10, 20, 30, 40, 50, 60, 70, 80, and 90.

Figure 2B:
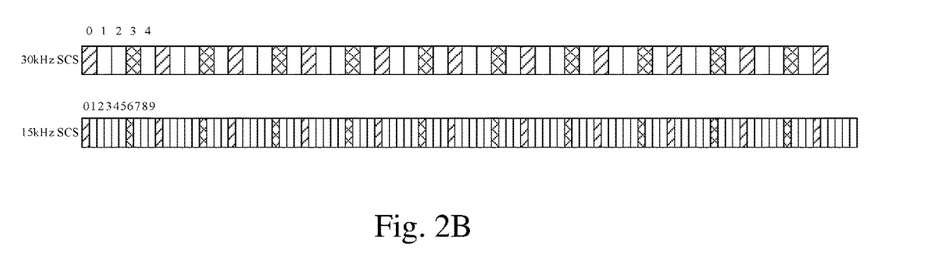
FIG. 2B is a schematic diagram of another interlace structure according to an embodiment of the present application.

For another example, in an NR-U system, assuming that M is a quantity of interlaces of the system. When a carrier bandwidth is 20 MHz, for 15 kHz Sub-Carrier Space (SCS), the system includes 10 interlaces (that is, M=10), and each interlace includes 10 or 11 PRBs; and for 30 kHz SCS, the system includes 5 interlaces (that is, M=5), and each interlace includes 10 or 11 PRBs. A case where a quantity of PRBs included in 20 MHz bandwidth is 106 when SCS is 15 kHz, and a quantity of PRBs included in 20 MHz bandwidth is 51 when SCS is 30 kHz is taken as an example. Refer to FIG. 2A which is a schematic diagram of another interlace structure according to an embodiment of the present application. FIG. 2B shows structures of interlace numbers 0 and 6 (namely interlace #0 and interlace #6) under 15 kHz SCS, in which interlace #0 includes 11 PRBs and interlace #6 includes 10 PRBs. FIG. 2B further shows structures of interlace numbers 0 and 3 (namely interlace #0 and interlace #3) under 30 kHz SCS, in which interlace #0 includes 11 PRBs and interlace #3 includes 10 PRBs. It may be understood that a quantity of PRBs included in an NR-U system under a bandwidth may or may not be consistent with an NR system, for example, there may be a new quantity of PRBs, which is not limited in the present application.

For another example, when a carrier bandwidth is greater than 20 MHz, for 15 kHz SCS, the system includes 10 interlaces (that is, M=10); and for 30 kHz SCS, the system includes five interlaces (i.e., M=5), and a quantity of PRBs included in each interlace may be different according to different carrier bandwidths, which will not be repeated here.

In a scenario of using interlaces for PUCCH transmission, a terminal may be configured with multiple interlaces (at least two, that is, two or more than two interlaces) for PUCCH transmission, and how the terminal determines to implement PUCCH transmission based on configured multiple interlaces becomes a key.

It may be understood that the communication system shown in FIG. 1 and the interlace structures shown in FIGS. 2a and 2b are merely examples, and does not constitute limitations on the present application. Those of ordinary skilled in the art may know that with evolving of network architectures and emerging of new service scenarios, technical solutions provided by the present application are also applicable to similar technical problems.

The present application discloses a PUCCH transmission method and related devices, wherein a target interlace can be determined from at least two interlaces to achieve PUCCH transmission based on a target interlace. A detailed description will be given below in combination with the accompanying drawings.

Figure 3:
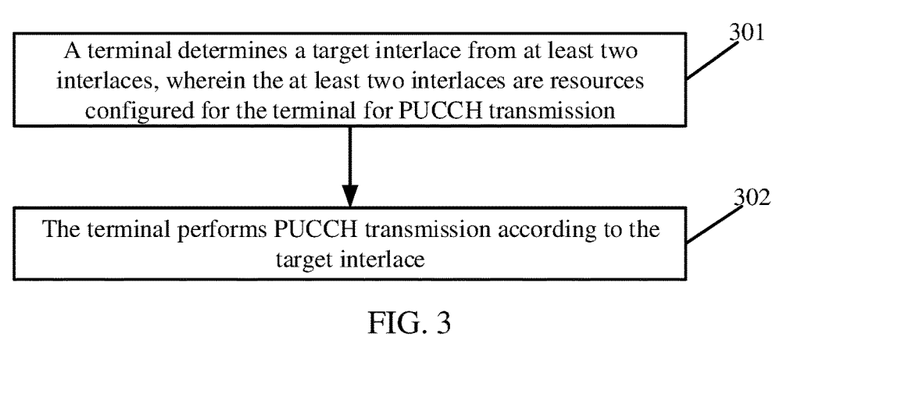
FIG. 3 is a schematic flowchart of a PUCCH transmission method according to an embodiment of the present application.

Referring to FIG. 3, which is a schematic flowchart of a PUCCH transmission method according to an embodiment of the present application, the method of this embodiment may be applied to the above-mentioned communication system, and may be specifically applied to a terminal. As shown in FIG. 3, the method may include following acts 301-302.

In act 301, a terminal determines a target interlace from at least two interlaces, wherein the at least two interlaces are resources configured for the terminal for PUCCH transmission.

The target interlace may be one or more of the at least two interlaces. The at least two interlaces may be configured for the terminal by a network device, or may be specified by a protocol, or may be determined by a terminal in other ways, etc., which is not limited in the present application.

In act 302, the terminal performs PUCCH transmission according to the target interlace.

Optionally, the target interlace may be determined according to Orthogonal Cover Code (OCC) configuration information, and/or the target interlace may be determined according to first indication information, and/or the target interlace may be determined according to a preset rule, which is not limited in the present application. The first indication information may include indication information for determining the target interlace.

In a possible implementation, a terminal may determine the target interlace from the at least two interlaces according to OCC configuration information. For example, the terminal may determine the target interlace according to whether the at least two interlaces correspond to the OCC configuration information and/or OCC lengths included in the OCC configuration information corresponding to the at least two interlaces. Optionally, the OCC configuration information may be indicated to the terminal by the network device, for example, the OCC configuration information may be carried in a PUCCH resource parameter and sent to a terminal, that is, the PUCCH resource parameter includes the OCC configuration information, and the terminal may receive the PUCCH resource parameter to obtain the OCC configuration information. For another example, the OCC configuration information may be carried in a PUCCH format 2 parameter and/or a PUCCH format 3 parameter and sent to the terminal, that is, the PUCCH format 2 parameter and/or the PUCCH format 3 parameter include the OCC configuration information, and then the terminal may receive the PUCCH format 2 parameter and/or the PUCCH format 3 parameter to obtain the OCC configuration information.

The PUCCH resource parameter, the PUCCH format 2 parameter, and/or the PUCCH format 3 parameter involved in the present application may be a Radio Resource Control (RRC) configuration parameter, such as an RRC configuration parameter sent by a network device, and a terminal may receive the RRC configuration parameter. The PUCCH resource parameter, the PUCCH format 2 parameter, and/or the PUCCH format 3 parameter may be carried in a same RRC configuration parameter or in different RRC configuration parameters, which is not limited in the present application. For example, the PUCCH resource parameter may be a PUCCH Resource parameter such as a PUCCH Resource Information Element (IE), the PUCCH format 2 parameter may be a PUCCH format2 (PF2 for short) parameter such as a PUCCH format2 IE, and a PUCCH format 3 parameter may be a PUCCH format3 (PF3 for short) parameter such as a PUCCH format3 IE.

For example, the at least two interlaces include a first interlace and a second interlace. If the first interlace corresponds to OCC configuration information and the second interlace does not correspond to the OCC configuration information, the terminal may determine that the target interlace includes the first interlace, that is, the first interlace is used as a target interlace. In other words, the terminal may determine an interlace corresponding to OCC configuration information as a target interlace, that is, the target interlace may be an interlace corresponding to OCC configuration information among the at least two interlaces.

For another example, the at least two interlaces include a first interlace and a second interlace. If OCC configuration information corresponding to the first interlace is an OOC length with a value of 1, that is, an OCC length corresponding to the first interlace is 1, and OCC configuration information corresponding to the second interlace is an OOC length with a value greater than 1, that is, an OCC length corresponding to the second interlace is greater than 1, then the terminal may determine that the target interlace includes the first interlace. That is, the terminal may determine an interlace corresponding to OCC configuration information with an OCC length of 1 as a target interlace, that is, the target interlace may be an interlace with an OCC length of 1 among the at least two interlaces.

For another example, the at least two interlaces include a first interlace and a second interlace. If the first interlace corresponds to OCC configuration information and the second interlace does not correspond to the OCC configuration information, the terminal determines that the target interlace includes the second interlace, that is, the second interlace is used as a target interlace. In other words, the terminal may determine an interlace not corresponding to OCC configuration information as a target interlace, that is, the target interlace may be an interlace not corresponding to OCC configuration information among the at least two interlaces.

For another example, the at least two interlaces include a first interlace and a second interlace. If OCC configuration information corresponding to the first interlace is an OOC length with a value of 1, that is, an OCC length corresponding to the first interlace is 1, and the OCC configuration information corresponding to the second interlace is an OOC length with a value greater than 1, that is, an OCC length corresponding to the second interlace is greater than 1, then the terminal may determine that the target interlace includes the second interlace. That is, the terminal may determine an interlace corresponding to OCC configuration information with an OCC length greater that 1 as a target interlace, that is, the target interlace may be an interlace with an OCC length greater than 1 among the at least two interlaces. Optionally, in some embodiments, the target interlace may also be an interlace whose OCC length is not 1 among the at least two interlaces.

Exemplarily, a configuration of the RRC configuration parameter may be as follows.

```
PUCCH-Resource :: = SEQUENCE {
pucch-ResourceId PUCCH-ResourceId,
```

-continued

```
Interlace allocation-r16 interlace-ID, //Identifier of a first interlace,
used for all PUCCH formats (PFs)
  OCC-Length-r16 INTEGER (1,2,4), OPTIONAL, -- Need R
  OCC-Index-r16 INTEGER (0..3), OPTIONAL, -- Need R
  format CHOICE {
  format0 PUCCH-format0,
  format1 PUCCH-format1,
  format2 PUCCH-format2,
  format3 PUCCH-format3,
  }
  }
  PUCCH-format2 ::= SEQUENCE {
  Interlace1 Interlace-Id or on/off identifier, OPTIONAL, -- Need
R //Identifier of a second interlace, used for PF2 (i.e., PUCCH-format2)
  nrofSymbols INTEGER (1..2),
  startingSymbolIndex INTEGER(0..13)
  }
  PUCCH-format3 ::= SEQUENCE {
  Interlace1 Interlace-Id or on/off identifier, OPTIONAL, -- Need R
//Identifier of a second interlace, used for PF3 (i.e., PUCCH-format3)
  nrofSymbols INTEGER (4..14),
  startingSymbolIndex INTEGER(0..10)
  }
```

Therefore, a terminal may determine the target interlace according to OCC configuration information to perform PUCCH transmission based on the target interlace.

Optionally, the terminal may determine a target interlace from the at least two interlaces according to first indication information, wherein the first indication information may include indication information for determining the target interlace. Optionally, the first indication information may include: indication information for indicating an activation state of a designated interlace; or, indication information for indicating that the designated interlace is the target interlace, wherein the designated interlace is one of the at least two interlaces.

In a possible implementation, the at least two interlaces may include a first interlace and a second interlace; a PUCCH resource parameter includes configuration information of the first interlace, and a PUCCH format 2 parameter and/or a PUCCH format 3 parameter include configuration information of the second interlace and first indication information; then the terminal may determine that the target interlace includes the first interlace or the second interlace according to the first indication information. The PUCCH resource parameter may be indicated to the terminal by the network device, the network device may send the PUCCH resource parameter to the terminal, and the terminal may receive the PUCCH resource parameter. Optionally, configuration information of an interlace involved in the present application may include an identifier of the interlace, such as a number and an index.

For example, when the terminal determines that the target interlace includes the first interlace or the second interlace according to the first indication information, one or more of following situations is included, it may be determined by a following situation whether the target interlace includes the first interlace or the second interlace.

1) The terminal determines that the target interlace corresponding to the PUCCH format 2 includes the second interlace if the configuration information of the second interlace and the first indication information are included in the PUCCH format 2 parameter and the first indication information indicates activation of the second interlace.

2) The terminal determines that the target interlace corresponding to the PUCCH format 2 includes the first interlace if the configuration information of the second interlace and the first indication information are included in the PUCCH format 2 parameter and the first indication information indicates deactivation of the second interlace.

3) The terminal determines that the target interlace corresponding to the PUCCH format 2 includes the first interlace if the configuration information of the second interlace and the first indication information are included in the PUCCH format 2 parameter and the first indication information indicates the identifier of the first interlace.

4) The terminal determines that the target interlace corresponding to the PUCCH format 2 includes the second interlace if the configuration information of the second interlace and the first indication information are included in the PUCCH format 2 parameter and the first indication information indicates the identifier of the second interlace.

5) The terminal determines that the target interlace corresponding to the PUCCH format 3 includes the second interlace if the configuration information of the second interlace and the first indication information are included in the PUCCH format 3 parameter and the first indication information indicates activation of the second interlace.

6) The terminal determines that the target interlace corresponding to the PUCCH format 3 includes the first interlace if the configuration information of the second interlace and the first indication information are included in the PUCCH format 3 parameter and the first indication information indicates deactivation of the second interlace.

7) The terminal determines that the target interlace corresponding to the PUCCH format 3 includes the first interlace if the configuration information of the second interlace and the first indication information are included in the PUCCH format 3 parameter and the first indication information indicates the identifier of the first interlace.

8) The terminal determines that the target interlace corresponding to the PUCCH format 3 includes the second interlace if the configuration information of the second interlace and the first indication information are included in the PUCCH format 3 parameter and the first indication information indicates the identifier of the second interlace.

Optionally, the first indication information may be an on/off indication, or a status indication, such as 0/1, and so on. For example, taking the first indication information being on/off carried in a PUCCH resource parameter such as a PUCCH Resource IE as an example, if the first indication information included in the PUCCH Resource IE is on, it may indicate activation of the second interlace; if the indication information included in the PUCCH Resource IE is off, it may indicate deactivation of the second interlace. For another example, taking the indication information being 0/1 carried in a PUCCH resource parameter such as a PUCCH Resource IE as an example, if the indication information included in the PUCCH Resource IE is 1, it may indicate activation of the second interlace; if the indication information included in the PUCCH Resource IE is 0, it may indicate deactivation of the second interlace. Or, the network device may also perform deactivation or activation indications in other ways, which are not all listed here.

Exemplarily, a configuration of RRC configuration parameters may also be as follows.

```
PUCCH-Resource :: = SEQUENCE 1
pucch-ResourceId PUCCH-ResourceId,
Interlace allocation-r16 interlace-ID, //Identifier of a first interlace, used for all PFs
format CHOICE {
format0 PUCCH-format0,
format1 PUCCH-format1,
format2 PUCCH-format2,
format3 PUCCH-format3,
}
}
PUCCH-format2 ::= SEQUENCE {
Interlace1 Interlace-Id or on/off identifier, OPTIONAL, -- Need R
//Identifier of a second interlace, used for PF2
useInterlaceIFlag ENUMERATED {true}, OPTIONAL, -- Need R
//This field appears, interlace 1 is always used when one of two interlaces is used; otherwise, interlace 0 is used.
OCC-Length-r16 INTEGER (1,2,4), OPTIONAL, -- Need R
OCC-Index-r16 INTEGER (0..3), OPTIONAL, -- Need R
nrofSymbols INTEGER (1..2),
startingSymbolIndex INTEGER(0..13)
}
PUCCH-format3 ::= SEQUENCE {
Interlace1 Interlace-Id or on/off identifier, OPTIONAL, -- Need R
//Identifier of a second interlace, used for PF3
useInterlaceIFlag ENUMERATED {true}, OPTIONAL, -- Need R
//This field appears, interlace 1 is always used when one of two interlaces is used; otherwise, interlace 0 is used.
OCC-Length-r16 INTEGER (1,2,4), OPTIONAL, -- Need R
OCC-Index-r16 INTEGER (0..3), OPTIONAL, -- Need R
nrofSymbols INTEGER (4..14),
startingSymbolIndex INTEGER(0..10)
}
```

That is to say, a PUCCH format 2 parameter such as a PUCCH format2 IE and a PUCCH format 3 parameter such as a PUCCH format3 IE are used for determining whether a first interlace or a second interlace is included in a target interlace corresponding to PF2 and determining whether the first interlace or the second interlace is included in a target interlace corresponding to PF3 according to activation or deactivation information indicated by the second interlace.

Exemplarily, a configuration of RRC configuration parameters may also be as follows.

```
PUCCH-Resource :: = SEQUENCE {
pucch-ResourceId PUCCH-ResourceId,
Interlace allocation-r16 interlace-ID, //Identifier of a first interlace, used for all PFs
format CHOICE {
format0 PUCCH-format0,
format1 PUCCH-format1,
format2 PUCCH-format2,
format3 PUCCH-format3,
}
}
PUCCH-format2 ::= SEQUENCE {
Interlace1 Interlace-Id or on/off identifier, OPTIONAL, -- Need R
//Identifier of a second interlace, used for PF2
useInterlace INTEGER (0,1), OPTIONAL, --Need R //When one of the two interlaces is used, it is explicitly indicated to use interlace 0 or interlace 1.
OCC-Length-r16 INTEGER (1,2,4), OPTIONAL, -- Need R
OCC-Index-r16 INTEGER (0..3), OPTIONAL, -- Need R
nrofSymbols INTEGER (1..2),
startingSymbolIndex INTEGER(0..13)
}
PUCCH-format3 ::= SEQUENCE {
Interlace1 Interlace-Id or on/off identifier, OPTIONAL, -- Need R
//Identifier of a second interlace, used for PF3
useInterlace INTEGER (0,1), OPTIONAL, --Need R //When one of the two interlaces is used, it is explicitly indicated to use interlace 0 or interlace 1.
OCC-Length-r16 INTEGER (1,2,4), OPTIONAL, -- Need R
OCC-Index-r16 INTEGER (0..3), OPTIONAL, -- Need R
nrofSymbols INTEGER (4..14),
```

```
startingSymbolIndex INTEGER(0..10)
}
```

That is to say, a PUCCH format 2 parameter such as a PUCCH format2 IE and a PUCCH format 3 parameter such as a PUCCH format3 IE indicates the identifier of the first interlace or the identifier of the second interlace, to determine whether a first interlace or a second interlace is included in a target interlace corresponding to PF2, and determine whether the first interlace or the second interlace is included in a target interlace corresponding to PF3.

In a possible implementation, the at least two interlaces may include a first interlace and a second interlace; a PUCCH resource parameter includes configuration information of the first interlace and first indication information, and a PUCCH format 2 parameter and/or a PUCCH format 3 parameter include configuration information of the second interlace; then the terminal may determine that the target interlace includes the first interlace or the second interlace according to the first indication information. The PUCCH resource parameter may be indicated to the terminal by the network device, which will not be repeated here.

For example, when the terminal determines that the target interlace includes the first interlace or the second interlace according to the first indication information, one or more of following situations is included, it may be determined by a following situation whether the target interlace includes the first interlace or the second interlace.

1) If the first indication information indicates activation of the first interlace, the terminal determines that a target interlace corresponding to the PUCCH format 2 and/or the PUCCH format 3 includes the first interlace.
2) If the first indication information indicates deactivation of the first interlace, the terminal determines that a target interlace corresponding to the PUCCH format 2 and/or the PUCCH format 3 includes the second interlace.
3) If the first indication information indicates the identifier of the first interlace, the terminal determines that a target interlace corresponding to the PUCCH format 2 and/or the PUCCH format 3 includes the first interlace.
4) If the first indication information indicates the identifier of the second interlace, the terminal determines that a target interlace corresponding to the PUCCH format 2 and/or the PUCCH format 3 includes the second interlace.

Optionally, the first indication information may be an on/off indication, or a status indication, such as 0/1, and so on, which is similar to the above-mentioned first indication information for activating or deactivating the second interlace, which will not be repeated here.

Exemplarily, a configuration of RRC configuration parameters may also be as follows.

```
PUCCH-Resource :: = SEQUENCE {
pucch-ResourceId PUCCH-ResourceId,
Interlace allocation-r16 interlace-ID, //Identifier of a first interlace, used for all PFs
useInterlace0Flag ENUMERATED {true}, OPTIONAL, -- Need R
//This field appears, interlace 0 is always used when one of two interlaces is used; otherwise, interlace 1 is used.
  format CHOICE {
  format0 PUCCH-format0,
  format1 PUCCH-format1,
  format2 PUCCH-format2,
  format3 PUCCH-format3,
  }
}
PUCCH-format2 ::= SEQUENCE {
Interlace1 Interlace-Id or on/off identifier, OPTIONAL, -- Need R
//Identifier of a second interlace, used for PF2
  OCC-Length-r16 INTEGER (1,2,4), OPTIONAL, -- Need R
  OCC-Index-r16 INTEGER (0..3), OPTIONAL, -- Need R
  nrofSymbols INTEGER (1..2),
  startingSymbolIndex INTEGER(0..13)
}
PUCCH-format3 ::= SEQUENCE }
Interlace1 Interlace-Id or on/off identifier, OPTIONAL, -- Need R
//Identifier of a second interlace, used for PF3
  OCC-Length-r16 INTEGER (1,2,4), OPTIONAL, -- Need R
  OCC-Index-r16 INTEGER (0..3), OPTIONAL, -- Need R
  nrofSymbols INTEGER (4..14),
  startingSymbolIndex INTEGER(0..10)
}
```

That is to say, a PUCCH format2 IE and a PUCCH format3 IE may be used for determining whether a first interlace or a second interlace is included in a target interlace corresponding to PF2 and determining whether the first interlace or the second interlace is included in a target interlace corresponding to PF3 according to activation or deactivation information indicated by the first interlace.

In a possible implementation, the terminal may also determine a target interlace from the at least two interlaces according to a preset rule. For example, the terminal may fixedly use one or more fixed interlaces of the at least two interlaces (as specified in a protocol or determined by other methods) as a target interlace, that is, the terminal may use the fixed interlaces for PUCCH transmission.

For example, the at least two interlaces include a first interlace and a second interlace, a PUCCH resource parameter includes configuration information of the first interlace, and a PUCCH format 2 parameter and/or a PUCCH format 3 parameter include configuration information of the second interlace, and the terminal may determine that the target interlace includes the first interlace or the second interlace. For example, the terminal may fixedly determine a first interlace included in the PUCCH resource parameter as a target interlace, or fixedly determine a second interlace included in the PUCCH format 2 parameter and/or PUCCH format 3 parameter as a target interlace.

In a possible implementation, the target interlace may be one of the at least two interlaces. Optionally, the terminal may determine that the target interlace is one interlace according to an information bit size and a maximum transmission code rate of a transmission block in the PUCCH.

Assuming that the terminal is configured with N (e.g., N=4 or other numbers) PUCCH Resource Sets, and each PUCCH Resource Set includes M (e.g., M=16 in a first PUCCH resource set and M=8 in other PUCCH resource sets) PUCCH resources. When the terminal needs to perform PUCCH transmission, the terminal may determine a PUCCH resource set to be used from the N PUCCH resource sets according to an information bit size of a transmission block in a PUCCH, such as a payload size. Further, the terminal may determine a used PUCCH resource in the PUCCH resource set to be used according to PUCCH resource indication information (such as PUCCH resource indicator) in Downlink Control Information (DCI), or may determine a used PUCCH resource according to a PUCCH resource identifier, such as PUCCH-ResourceId, in an RRC configuration parameter. The network device may configure for the terminal to obtain a first frequency domain parameter corresponding to the PUCCH resource, for example, through a high-layer signaling configuration.

In addition, the terminal will be configured with a maximum code rate parameter (such as maxCodeRate) for determining a PUCCH transmission rate, which is recorded as a maximum transmission rate and may be used for determining a second frequency domain parameter for transmitting Uplink Control Information (UCI) on a PUCCH, that is, the second frequency domain parameter for PUCCH transmission. Optionally, the first frequency domain parameter and the second frequency domain parameter may be a quantity of PRBs included in the PUCCH resource and/or a quantity of interlaces included in the PUCCH resource, and the second frequency domain parameter is less than or equal to the first frequency domain parameter.

That is to say, the terminal may determine the second frequency domain parameter according to an information bit size of a transmission block, such as a payload size (that is, a payload size to be transmitted) and a configured maximum transmission code rate, for example, determine a quantity of used interlaces, that is, a quantity of interlaces included in a target interlace. For example, if the terminal is configured with K (e.g., K=2) interlaces, each interlace includes T PRBs. When the terminal determines that a quantity of PRBs corresponding to the second frequency domain parameter is less than $(K-1)*T$ and greater than or equal to $(K-2)*T$, the terminal may determine that the second frequency domain parameter corresponds to $(K-1)$ interlaces, that is, the terminal may determine that a target interlace is one interlace. Further, the terminal determines one interlace (as a target interlace) from the at least two interlaces for PUCCH transmission.

In this embodiment, the terminal can determine a target interlace from at least two interlaces configured for the terminal for PUCCH transmission, and perform PUCCH transmission according to the target interlace, thereby achieving interlace-based PUCCH transmission.

Figure 4:
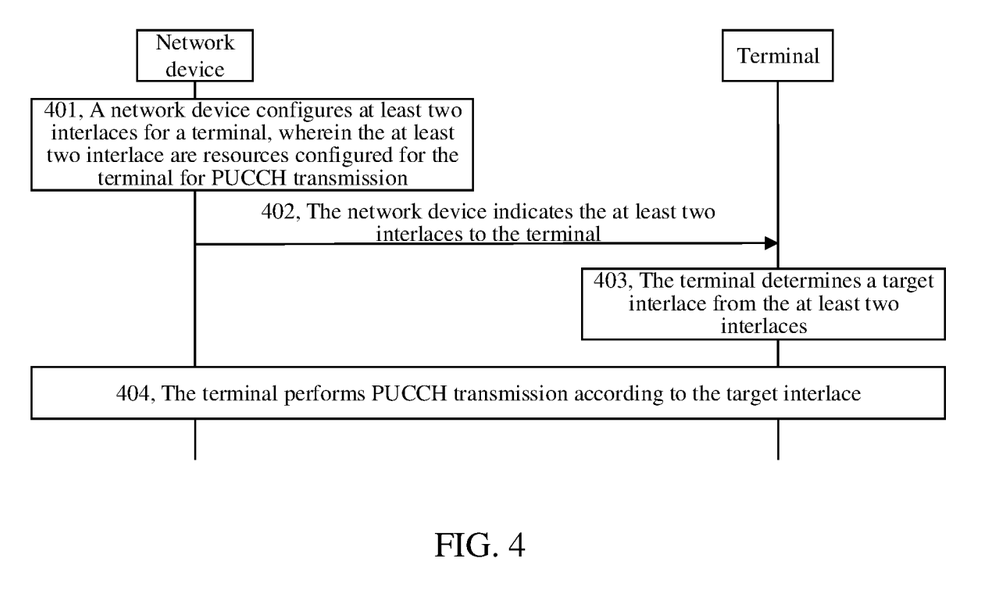
FIG. 4 is a schematic diagram of interactions of a PUCCH transmission method according to an embodiment of the present application.

Referring to FIG. 4, which is a schematic diagram of interaction of a PUCCH transmission method according to an embodiment of the present application. As shown in FIG. 4, the method may include acts 401-404.

In act 401, a network device configures at least two interlaces for a terminal, wherein the at least two interlace are resources configured for the terminal for PUCCH transmission.

In act 402, the network device indicates the at least two interlaces to the terminal.

The network device indicating the at least two interlaces to the terminal may mean that the network device sends information of the at least two interlaces to the terminal, and the terminal may receive the information of the at least two interlaces to determine the at least two interlaces. For example, the network device may indicate the information of the at least two interlaces by sending an RRC configuration parameter to the terminal, and the terminal may receive the RRC configuration parameter to determine the at least two interlaces. Optionally, the at least two interlaces may be indicated through a PUCCH resource parameter, a PUCCH format 2 parameter, and/or a PUCCH format 3 parameter.

In act 403, the terminal determines a target interlace from the at least two interlaces.

In act 404, the terminal performs PUCCH transmission according to the target interlace.

In a possible implementation, the network device may send OCC configuration information to the terminal. The at least two interlaces may include a first interlace and a second interlace, and the OCC configuration information is used for indicating whether the first interlace and the second interlace correspond to the OCC configuration information, and/or for indicating an OCC length corresponding to the first interlace and an OCC length corresponding to the second interlace. Further, the terminal may determine the target interlace based on the OCC configuration information, which will not be repeated here.

In a possible implementation, the network device may send a PUCCH resource parameter to the terminal, wherein the PUCCH resource parameter includes the OCC configuration information; or, the network device may send a PUCCH format 2 parameter and/or a PUCCH format 3 parameter to the terminal, wherein the PUCCH format 2 parameter and/or the PUCCH format 3 parameter include the OCC configuration information. That is to say, the OCC configuration information may be carried in the PUCCH resource parameter, the PUCCH format 2 parameter, or the PUCCH format 3 parameter, and sent to the terminal, and the terminal receives the OCC configuration information.

In a possible implementation, the at least two interlaces includes a first interlace and a second interlace, and a PUCCH resource parameter includes configuration information of the first interlace, and a PUCCH format 2 parameter and/or a PUCCH format 3 parameter include configuration information of the second interlace and first indication information. Optionally, the first indication information indicates activation of the second interlace, or the first indication information indicates deactivation of the second interlace, or the first indication information indicates an identifier of the first interlace, or the first indication information indicates an identifier of the second interlace. Further, the terminal may determine the target interlace according to the indication information, which will not be repeated here.

In a possible implementation, the at least two interlaces includes a first interlace and a second interlace, a PUCCH resource parameter includes configuration information of the first interlace and first indication information, and a PUCCH format 2 parameter and/or a PUCCH format 3 parameter include configuration information of the second interlace; wherein, the PUCCH resource parameter, the PUCCH format 2 parameter, and the PUCCH format 3 parameter are Radio Resource Control (RRC) configuration parameters sent by the network device. Optionally, the first indication information indicates activation of the first interlace, or the first indication information indicates deactivation of the second interlace, or the first indication information indicates an identifier of the first interlace, or the first indication information indicates an identifier of the second interlace. Further, the terminal may determine the target interlace according to the indication information, which will not be repeated here.

In a possible implementation, the at least two interlaces includes a first interlace and a second interlace, a PUCCH resource parameter includes configuration information of the first interlace, and a PUCCH format 2 parameter and/or a PUCCH format 3 parameter include configuration information of the second interlace. Further, the terminal may determine a target interlace from the at least two interlaces according to a preset rule, for example, determine that the target interlace includes the first interlace or the second interlace, which will not be repeated here.

Optionally, the rest of the description of acts 403-404 may refer to the related description of the embodiment shown in FIG. 3, which will not be repeated here.

In a possible implementation, the network device may also determine a quantity of interlaces corresponding to the at least two interlaces. Further, when the network device indicates the at least two interlaces to the terminal, it may indicate to the terminal according to the quantity of interlaces. Or, in a possible implementation, the quantity of interlaces may also be specified by a protocol, or the network device may also indicate the quantity of interlaces to the terminal through other ways or signaling, or the terminal may also determine the quantity of interlaces through other ways, which is not limited in the present application. For example, the quantity of interlaces may be carried in a PUCCH resource parameter, a PUCCH format 2 parameter, and/or a PUCCH format 3 parameter, so that the terminal can quickly determine the quantity of the at least two interlaces to facilitate determination of a target interlace.

In a possible implementation, the configuration information of the first interlace may include an identifier of the first interlace, and the identifier may refer to a number, an index, and the like of an interlace. The configuration information of the second interlace may include an offset of each second interlace relative to the identifier of the first interlace, or a superposition offset, which may be used for indicating an identifier of each second interlace. Further, the terminal may determine an identifier of the second interlace, i.e. determine the second interlace, according to the identifier of the first interlace and the offset, or according to the identifier of the first interlace and the superposition offset.

In a possible implementation, the indication information may also be used for indicating information of an LBT subband corresponding to the PUCCH transmission. Optionally, the information of the LBT subband may be carried in a PUCCH resource parameter, or carried in a PUCCH format 2 parameter, or carried in a PUCCH format 3 parameter. Optionally, in a possible design, the information of the LBT subband may also be specified by a protocol, or the network device may indicate to the terminal through other ways, or the terminal may determine the information of the LBT subband through other ways, which is not limited in the present application. Therefore, when the terminal performs PUCCH transmission, it can perform PUCCH transmission according to the LBT subband, which improves transmission reliability.

In this embodiment, the network device can configure at least two interlaces for the terminal for PUCCH transmission and indicate the at least two interlaces to the terminal, so that the terminal can determine a target interlace from the at least two interlaces, and perform PUCCH transmission according to the target interlace, thereby achieving interlace-based PUCCH transmission, and helping to improve flexibility and reliability of interlace-based PUCCH transmission.

It may be understood that the above method embodiments are examples of the PUCCH transmission method of the present application, and the descriptions of each embodiment have their own emphases. For parts that are not detailed in one embodiment, the related descriptions of other embodiments may be referred to.

Figure 5:
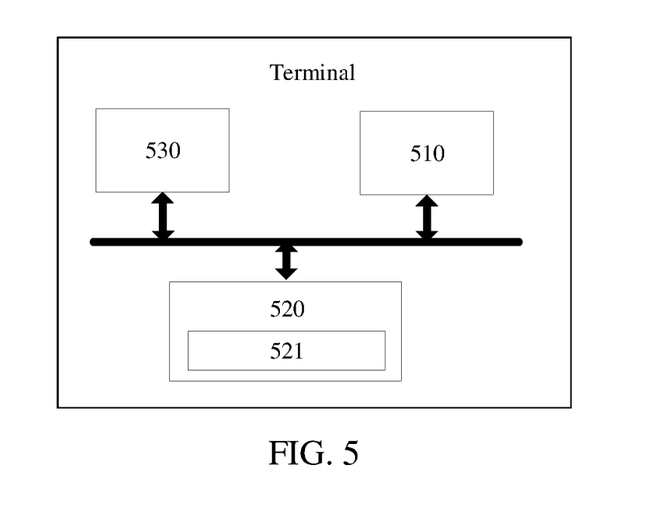
FIG. 5 is a schematic diagram of a structure of a terminal according to an embodiment of the present application.

Referring to FIG. 5, which is a schematic diagram of a structure of a terminal according to an embodiment of the present application. As shown in FIG. 5, the terminal 500 may include: a processor 510, a memory 520, a communication interface 530, and one or more programs 521; wherein, the one or more programs 521 are stored in the memory 520 and is configured to be executed by the processor 510, and the programs include instructions for performing following acts: determining a target interlace from at least two interlaces, wherein the at least two interlaces are resources configured for the terminal for PUCCH transmission; and calling a communication interface 530 and performing PUCCH transmission according to the target interlace.

In a possible implementation, when determining the target interlace from the at least two interlaces, the instructions in the program are specifically used for performing a following operation: determining a target interlace from the at least two interlaces according to Orthogonal Cover Code (OCC) configuration information.

In a possible implementation, the at least two interlaces include a first interlace and a second interlace; and when determining the target interlace from the at least two interlaces according to the OCC configuration information, the instructions in the program are specifically used for performing following operations: determining that the target interlace includes the first interlace if the first interlace corresponds to the OCC configuration information and the second interlace does not correspond to the OCC configuration information; or, determining that the target interlace includes the first interlace if the OCC configuration information corresponding to the first interlace includes an OCC length with a value of 1 and the OCC configuration information corresponding to the second interlace includes an OCC length with a value greater than 1.

In a possible implementation, the at least two interlaces include a first interlace and a second interlace; and when determining the target interlace from the at least two interlaces according to the OCC configuration information, the instructions in the program are specifically used for performing following operations: determining that the target interlace includes the second interlace if the first interlace corresponds to the OCC configuration information and the second interlace does not correspond to the OCC configuration information; or, determining that the target interlace includes the second interlace if the OCC configuration information corresponding to the first interlace includes an OCC length with a value of 1 and the OCC configuration information corresponding to the second interlace includes an OCC length with a value greater than 1.

In a possible implementation, a PUCCH resource parameter includes the OCC configuration information; or, a PUCCH format 2 parameter and/or a PUCCH format 3 parameter include the OCC configuration information; wherein the PUCCH resource parameter, the PUCCH format 2 parameter, and the PUCCH format 3 parameter are Radio Resource Control (RRC) configuration parameters sent by the network device.

In a possible implementation, when determining the target interlace from the at least two interlaces, the instructions in the program are specifically used for performing a following operation: determining a target interlace from the at least two interlaces according to first indication information, wherein the first indication information includes indication information for determining the target interlace.

In a possible implementation, the first indication information includes: indication information for indicating an activation state of a designated interlace; or, indication information for indicating that the designated interlace is the target interlace, wherein the designated interlace is one of the at least two interlaces.

In a possible implementation, the at least two interlaces include a first interlace and a second interlace; a PUCCH resource parameter includes the configuration information of the first interlace, and a PUCCH format 2 parameter and/or a PUCCH format 3 parameter include the configuration information of the second interlace and the first indication information; wherein, the PUCCH resource parameter, the PUCCH format 2 parameter, and the PUCCH format 3 parameter are Radio Resource Control (RRC) configuration parameters sent by the network device; and when determining the target interlace from the at least two interlaces according to the first indication information, the instructions in the program are specifically used for performing a following operation: determining that the target interlace includes the first interlace or the second interlace according to the first indication information.

In a possible implementation, the determining that the target interlace includes the first interlace or the second interlace according to the first indication information includes at least one of following situations.

Determining that a target interlace corresponding to the PUCCH format 2 includes the second interlace if the configuration information of the second interlace and the first indication information are included in the PUCCH format 2 parameter and the first indication information indicates activation of the second interlace.

Determining that a target interlace corresponding to the PUCCH format 2 includes the first interlace if the configuration information of the second interlace and the first indication information are included in the PUCCH format 2 parameter and the first indication information indicates deactivation of the second interlace.

Determining that a target interlace corresponding to the PUCCH format 2 includes the first interlace if the configuration information of the second interlace and the first indication information are included in the PUCCH format 2 parameter and the first indication information indicates the identifier of the first interlace.

Determining that a target interlace corresponding to the PUCCH format 2 includes the second interlace if the configuration information of the second interlace and the first indication information are included in the PUCCH format 2 parameter and the first indication information indicates the identifier of the second interlace.

Determining that a target interlace corresponding to the PUCCH format 3 includes the second interlace if the configuration information of the second interlace and the first indication information are included in the PUCCH format 3 parameter and the first indication information indicates activation of the second interlace.

Determining that a target interlace corresponding to the PUCCH format 3 includes the first interlace if the configuration information of the second interlace and the first indication information are included in the PUCCH format 3 parameter and the first indication information indicates deactivation of the second interlace.

Determining that a target interlace corresponding to the PUCCH format 3 includes the first interlace if the configuration information of the second interlace and the first indication information are included in the PUCCH format 3 parameter and the first indication information indicates the identifier of the first interlace.

Determining that a target interlace corresponding to the PUCCH format 3 includes the second interlace if the configuration information of the second interlace and the first indication information are included in the PUCCH format 3 parameter and the first indication information indicates the identifier of the second interlace.

In a possible implementation, the at least two interlaces include a first interlace and a second interlace; a PUCCH resource parameter includes configuration information of the first interlace and first indication information, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

When determining the target interlace from the at least two interlaces according to the first indication information, the instructions in the program are specifically used for performing a following operation: determining that the target interlace includes the first interlace or the second interlace according to the first indication information.

In a possible implementation, the determining that the target interlace includes the first interlace or the second interlace according to the first indication information includes at least one of following situations.

Determining that a target interlace corresponding to the PUCCH format 2 and/or the PUCCH format 3 includes the first interlace if the first indication information indicates activation of the first interlace.

Determining that a target interlace corresponding to the PUCCH format 2 and/or the PUCCH format 3 includes the second interlace if the first indication information indicates deactivation of the first interlace.

Determining that a target interlace corresponding to the PUCCH format 2 and/or the PUCCH format 3 includes the first interlace if the first indication information indicates an identifier of the first interlace.

Determining that a target interlace corresponding to the PUCCH format 2 and/or the PUCCH format 3 includes the second interlace if the first indication information indicates an identifier of the second interlace.

In a possible implementation, when determining the target interlace from the at least two interlaces, the instructions in the program are specifically used for performing a following operation: determining a target interlace from the at least two interlaces according to a preset rule.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

When determining the target interlace from the at least two interlaces according to the preset rule, the instructions in the program are specifically used for performing a following operation: determining that the target interlace includes the first interlace or the second interlace.

In a possible implementation, the target interlace is one of the at least two interlaces.

In a possible implementation, the indications in the program are also used for performing a following operation: determining that the target interlace is one interlace according to an information bit size and a maximum transmission code rate of a transmission block in the PUCCH.

Figure 6:
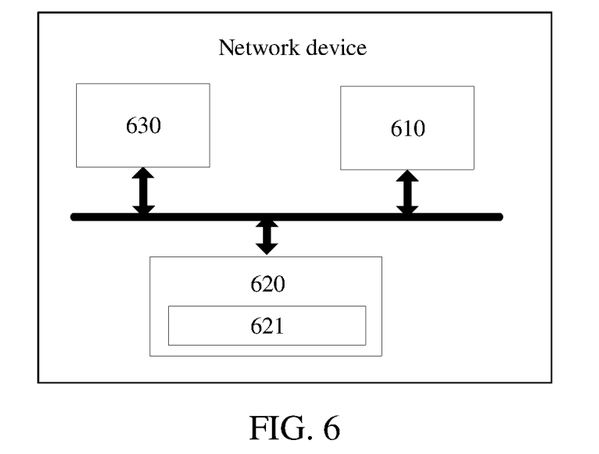
FIG. 6 is a schematic diagram of a structure of a network device according to an embodiment of the present application.

Referring to FIG. 6, which is a schematic diagram of a structure of a network device according to an embodiment of the present application. As shown in FIG. 6, the network device 600 may include: a processor 610, a memory 620, a communication interface 630, and one or more programs 621; wherein, the one or more programs 621 are stored in the memory 620 and is configured to be executed by the processor 610, and the programs include instructions for performing following acts: configuring at least two interlaces for a terminal, wherein the at least two interlace are resources configured for the terminal for PUCCH transmission; and calling a communication interface 630 to indicate the at least two interlaces to the terminal, so that the terminal performs PUCCH transmission based on a target interlace determined through the at least two interlaces.

In a possible implementation, the at least two interlaces include a first interlace and a second interlace; the indications in the programs are also used for performing following operations: calling a communication interface 630 to send Orthogonal Cover Code (OCC) configuration information to the terminal, and the OCC configuration information is used for indicating whether the first interlace and the second interlace correspond to the OCC configuration information, or for indicating an OCC length corresponding to the first interlace and an OCC length corresponding to the second interlace.

In a possible implementation, the indications in the programs are also used for performing following operations: calling a communication interface 630 to send a PUCCH resource parameter to the terminal, wherein the PUCCH resource parameter includes the OCC configuration information; and/or, calling a communication interface 630 to send a PUCCH format 2 parameter and/or a PUCCH format 3 parameter to the terminal, wherein the PUCCH format 2 parameter and/or the PUCCH format 3 parameter include the OCC configuration information; wherein the PUCCH resource parameter, the PUCCH format 2 parameter, and the PUCCH format 3 parameter are Radio Resource Control (RRC) configuration parameters sent by the network device.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace and first indication information; wherein the PUCCH resource parameter, the PUCCH format 2 parameter, and the PUCCH format 3 parameter are Radio Resource Control (RRC) configuration parameters sent by the network device.

In a possible implementation, the first indication information indicates activation of the second interlace, or the first indication information indicates deactivation of the second interlace, or the first indication information indicates an identifier of the first interlace, or the first indication information indicates an identifier of the second interlace.

In a possible implementation, the at least two interlaces include a first interlace and a second interlace; a PUCCH resource parameter includes configuration information of the first interlace and first indication information, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

In a possible implementation, the first indication information indicates activation of the first interlace, or the first indication information indicates deactivation of the second interlace, or the first indication information indicates an identifier of the first interlace, or the first indication information indicates an identifier of the second interlace.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

The foregoing describes the solutions of the embodiments of the present application mainly from a perspective of interaction between network elements. It may be understood that the terminal and the network device include corresponding hardware structures and/or software modules for performing various functions, so as to implement the foregoing functions. Those skilled in the art may easily understand that in combination with units and algorithm acts of various examples described in the embodiments disclosed herein, the present application may be implemented in a form of hardware or a combination of hardware and computer software. Whether a function is performed in a form of hardware or computer software driving hardware depends on a specific application and a design constraint condition of a technical solution. A person skilled in the art may use different methods to implement the described functions for each particular application, but it should not be considered that such an implementation goes beyond the scope of the present application.

In the embodiments of the present application, division for functional units may be performed on the terminal and network device according to the above method examples. For example, various functional units may be divided according to various functions, or two or more functions may be integrated into one processing unit. The above integrated unit may be implemented in a form of hardware, or may be implemented in a form of a software program module. It should be noted that, the division for the units in the embodiments of the present application is illustrative, and is merely division of logical functions. Other division modes may be used in actual implementations.

Figure 7:
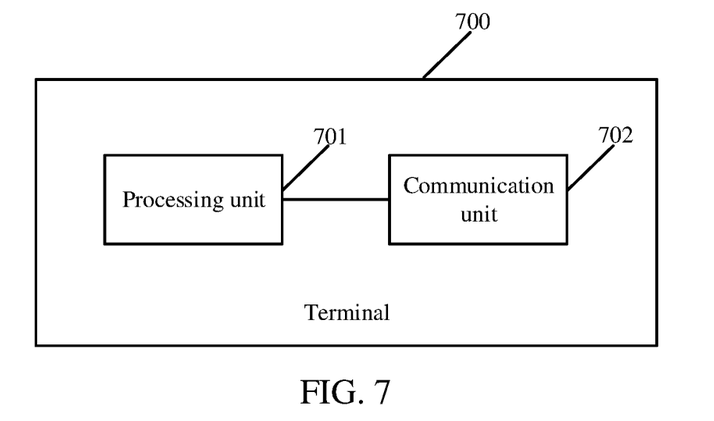
FIG. 7 is a schematic diagram of a structure of another terminal according to an embodiment of the present application.

Referring to FIG. 7, FIG. 7 shows another possible schematic diagram of a structure of the terminal involved in the above embodiments. As shown in FIG. 7, the terminal device 700 may include a processing unit 701 and a communication unit 702. These units may perform corresponding functions of the terminal in the above method examples. The processing unit 701 is configured to control and manage acts of the terminal. For example, the processing unit 701 is configured to support the terminal to perform act 301 to act 302 in FIG. 3, act 403 in FIG. 4, and/or other processes of techniques described in this document. The communication unit 702 may be configured to support communication between the terminal and another device, such as communication between the terminal and a network device. The terminal may further include a storage unit 703, configured to store program codes and data of the network device.

The processing unit 701 may be a processor or a controller, such as a Central Processing Unit (CPU), a general purpose processor, a Digital Signal Processor (DSP), an Application-Specific Integrated Circuit (ASIC), a Field Programmable Gate Array (FPGA), or another programmable logic device, a transistor logic device, a hardware component, or any combination thereof. The processing unit 601 may implement or execute various illustrative logical blocks, modules, and circuits described in combination with disclosed contents of the present application. The processor may also be a combination for implementing computing functions, e.g., a combination including one or more microprocessors, a combination of a DSP and a microprocessor. The communication unit 702 may be a transceiver, a transceiving circuit, a radio chip, or a communication interface, etc., and the storage unit 703 may be a memory.

For example, the processing unit 701 is configured to determine a target interlace from at least two interlaces, wherein the at least two interlaces are resources configured for the terminal for Physical Uplink Control Channel (PUCCH) transmission; and the communication unit 702 is configured to perform PUCCH transmission according to the target interlace.

In a possible implementation, the processing unit 701 may be specifically configured to determine a target interlace from the at least two interlaces according to Orthogonal Cover Code (OCC) configuration information.

In a possible implementation, the at least two interlaces include a first interlace and a second interlace; when the processing unit 701 is configured to determine the target interlace from the at least two interlaces according to the OCC configuration information, the processing unit 701 may be specifically configured to: determine that the target interlace includes the first interlace if the first interlace corresponds to the OCC configuration information and the second interlace does not correspond to the OCC configuration information; or, determine that the target interlace includes the first interlace if the OCC configuration information corresponding to the first interlace includes an OCC length with a value of 1 and the OCC configuration information corresponding to the second interlace includes an OCC length with a value greater than 1.

In a possible implementation, the at least two interlaces include a first interlace and a second interlace; when the processing unit 701 is configured to determine the target interlace from the at least two interlaces according to the OCC configuration information, the processing unit 701 may be specifically configured to: determine that the target interlace includes the second interlace if the first interlace corresponds to the OCC configuration information and the second interlace does not correspond to the OCC configuration information; or, determine that the target interlace includes the second interlace if the OCC configuration information corresponding to the first interlace includes an OCC length with a value of 1 and the OCC configuration information corresponding to the second interlace includes an OCC length with a value greater than 1.

In a possible implementation, a PUCCH resource parameter includes the OCC configuration information; or, a PUCCH format 2 parameter and/or a PUCCH format 3 parameter include the OCC configuration information; wherein the PUCCH resource parameter, the PUCCH format 2 parameter, and the PUCCH format 3 parameter are Radio Resource Control (RRC) configuration parameters sent by the network device.

In a possible implementation, the processing unit 701 may be specifically configured to determine a target interlace from the at least two interlaces according to first indication information, wherein the first indication information includes indication information for determining the target interlace.

In a possible implementation, the first indication information includes: indication information for indicating an activation state of a designated interlace; or, indication information for indicating that the designated interlace is the target interlace, wherein the designated interlace is one of the at least two interlaces.

Further, in a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace and first indication information; wherein the PUCCH resource parameter, the PUCCH format 2 parameter, and the PUCCH format 3 parameter are Radio Resource Control (RRC) configuration parameters sent by the network device.

When the processing unit 701 is configured to determine the target interlace from the at least two interlaces according to the first indication information, processing unit 701 may be specifically configured to: determine that the target interlace includes the first interlace or the second interlace according to the first indication information.

In a possible implementation, the determining that the target interlace includes the first interlace or the second interlace according to the first indication information includes at least one of following situations.

Determining that a target interlace corresponding to a PUCCH format 2 includes the second interlace if configuration information of the second interlace and the first indication information are included in the PUCCH format 2 parameter and the first indication information indicates activation of the second interlace.

Determining that a target interlace corresponding to a PUCCH format 2 includes the first interlace if configuration information of the second interlace and the first indication information are included in the PUCCH format 2 parameter and the first indication information indicates deactivation of the second interlace.

Determining that a target interlace corresponding to a PUCCH format 2 includes the first interlace if configuration information of the second interlace and the first indication information are included in the PUCCH format 2 parameter and the first indication information indicates an identifier of the first interlace.

Determining that a target interlace corresponding to a PUCCH format 2 includes the second interlace if configuration information of the second interlace and the first indication information are included in the PUCCH format 2 parameter and the first indication information indicates an identifier of the second interlace.

Determining that a target interlace corresponding to a PUCCH format 3 includes the second interlace if configuration information of the second interlace and the first indication information are included in the PUCCH format 3 parameter and the first indication information indicates activation of the second interlace.

Determining that a target interlace corresponding to a PUCCH format 3 includes the first interlace if configuration information of the second interlace and the first indication information are included in the PUCCH format 3 parameter and the first indication information indicates deactivation of the second interlace.

Determining that a target interlace corresponding to a PUCCH format 3 includes the first interlace if configuration information of the second interlace and the first indication information are included in the PUCCH format 3 parameter and the first indication information indicates an identifier of the first interlace.

Determining that a target interlace corresponding to a PUCCH format 3 includes the second interlace if configuration information of the second interlace and the first indication information are included in the PUCCH format 3 parameter and the first indication information indicates an identifier of the second interlace.

In a possible implementation, the at least two interlaces include a first interlace and a second interlace; a PUCCH resource parameter includes configuration information of the first interlace and first indication information, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

When the processing unit 701 is configured to determine the target interlace from the at least two interlaces according to the first indication information, the processing unit 701 may be specifically configured to: determine that the target interlace includes the first interlace or the second interlace according to the first indication information.

In a possible implementation, the determining that the target interlace includes the first interlace or the second interlace according to the first indication information includes at least one of following situations.

Determining that a target interlace corresponding to a PUCCH format 2 and/or a PUCCH format 3 includes the first interlace if the first indication information indicates activation of the first interlace.

Determining that a target interlace corresponding to a PUCCH format 2 and/or a PUCCH format 3 includes the second interlace if the first indication information indicates deactivation of the first interlace.

Determining that a target interlace corresponding to a PUCCH format 2 and/or a PUCCH format 3 includes the first interlace if the first indication information indicates an identifier of the first interlace.

Determining that a target interlace corresponding to a PUCCH format 2 and/or a PUCCH format 3 includes the second interlace if the first indication information indicates an identifier of the second interlace.

In a possible implementation, the processing unit 701 may be specifically configured to determine a target interlace from the at least two interlaces according to a preset rule.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

When the processing unit 701 is configured to determine a target interlace from the at least two interlaces according to the preset rule, the processing unit 701 may be specifically configured to: determining that the target interlace includes the first interlace or the second interlace.

In a possible implementation, the target interlace is one of the at least two interlaces.

In a possible implementation, the processing unit 701 may be further configured to determine that the target interlace is one interlace according to an information bit size and a maximum transmission code rate of a transmission block in the PUCCH.

When the processing unit 701 is a processor, the communication unit 702 is a communications interface, and the storage unit 703 is a memory, the terminal involved in the embodiment of the present application may be the terminal shown in FIG. 5.

Optionally, the terminal may achieve some or all acts performed by the terminal in the methods in the embodiments shown in FIGS. 3 to 4 above through the above-mentioned units. It should be understood that the embodiment of the present application is an apparatus embodiment corresponding to the method embodiment, and the description of the method embodiment is also applicable to the embodiment of the present application, which will not be repeated here.

Figure 8:
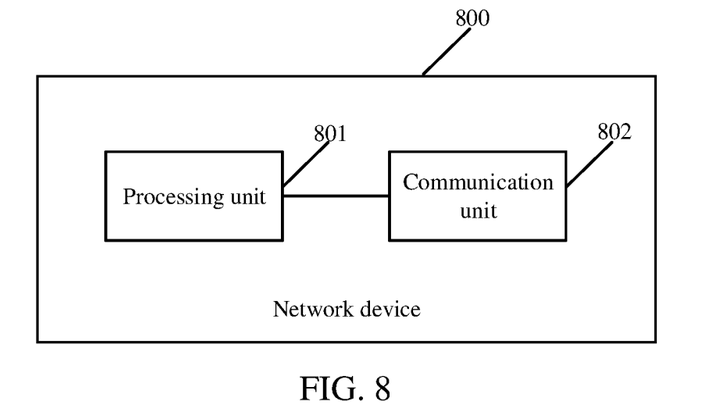
FIG. 8 is a schematic diagram of a structure of another network device according to an embodiment of the present application.

Referring to FIG. 8, FIG. 8 shows a schematic diagram of another possible structure of the network device involved in the above embodiments. As shown in FIG. 8, the network device 800 may include a processing unit 801 and a communication unit 802. These units may perform corresponding functions of the network device in the above method examples. The processing unit 801 is configured to control and manage acts of the network device. For example, the processing unit 801 is configured to support the network device to execute act 401 in FIG. 4, and/or other processes of techniques described in the present application. The communication unit 802 may be configured to support communication between the network device and other devices, such as communication between the network device and a terminal. The network device may further include a storage unit 803 configured to store program codes and data of the network device.

The processing unit 801 may be a processor or a controller, the communication unit 802 may be a transceiver, a transceiving circuit, a radio frequency chip, or a communication interface, and the storage unit 803 may be a memory.

For example, a processing unit 801 is configured to configure at least two interlaces for a terminal, wherein the at least two interlace are resources configured for the terminal for Physical Uplink Control Channel (PUCCH) transmission; and the communication unit 802 is configured to indicate the at least two interlaces to the terminal, so that the terminal may perform PUCCH transmission based on a target interlace determined through the at least two interlaces.

In a possible implementation, the at least two interlaces include a first interlace and a second interlace; the communication unit 802 is further configured to send Orthogonal Cover Code (OCC) configuration information to the terminal, and the OCC configuration information is used for indicating whether the first interlace and the second interlace correspond to the OCC configuration information, or for indicating an OCC length corresponding to the first interlace and an OCC length corresponding to the second interlace.

In a possible implementation, the communication unit 802 is further configured to send a PUCCH resource parameter to the terminal, wherein the PUCCH resource parameter includes the OCC configuration information; and/or, the communication unit 802 is further configured to send a PUCCH format 2 parameter and/or a PUCCH format 3 parameter to the terminal, wherein the PUCCH format 2 parameter and/or the PUCCH format 3 parameter include the OCC configuration information; wherein the PUCCH resource parameter, the PUCCH format 2 parameter, and the PUCCH format 3 parameter are Radio Resource Control (RRC) configuration parameters sent by the network device.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace and first indication information; wherein the PUCCH resource parameter, the PUCCH format 2 parameter, and the PUCCH format 3 parameter are Radio Resource Control (RRC) configuration parameters sent by the network device.

In a possible implementation, the first indication information indicates activation of the second interlace, or the first indication information indicates deactivation of the second interlace, or the first indication information indicates an identifier of the first interlace, or the first indication information indicates an identifier of the second interlace.

In a possible implementation, the at least two interlaces include a first interlace and a second interlace; a PUCCH resource parameter includes configuration information of the first interlace and first indication information, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

In a possible implementation, the first indication information indicates activation of the first interlace, or the first indication information indicates deactivation of the second interlace, or the first indication information indicates an identifier of the first interlace, or the first indication information indicates an identifier of the second interlace.

In a possible implementation, the at least two interlaces include a first interlace and a second interlace; a PUCCH resource parameter includes configuration information of the first interlace, and a PUCCH format 2 parameter and/or a PUCCH format 3 parameter include configuration information of the second interlace; wherein the PUCCH resource parameter, the PUCCH format 2 parameter, and the PUCCH format 3 parameter are Radio Resource Control (RRC) configuration parameters sent by the network device.

When the processing unit 801 is a processor, the communication unit 802 is a communication interface, and the storage unit 803 is a memory, the network device involved in the embodiment of the present application may be the network device shown in FIG. 6.

Optionally, the network device may achieve some or all acts performed by the network device in the methods of the embodiments shown in FIGS. 3 to 4 above through the above-mentioned units. It should be understood that the embodiment of the present application is an apparatus embodiment corresponding to the method embodiment, and the description of the method embodiment is also applicable to the embodiment of the present application, which will not be repeated here.

It may be understood that, division for the units in the embodiments of the present application is illustrative, and is merely division of logical functions. Other division modes may be used in actual implementations. Various functional units in the embodiments of the present application may be integrated in one processing unit, or various units may be physically present separately, or two or more units may be integrated in one unit. The above integrated unit may be implemented in a form of hardware, or may be implemented in a form of software function unit.

The present application further provides a communication system, including the above terminal and/or network device. Optionally, the system may further include other devices that interact with the above-mentioned network elements in solutions provided by the embodiments of the present application. The network device and/or the terminal may perform some or all acts in the methods of the embodiments shown in FIGS. 3 to 4 above, and details may be referred to related descriptions of the embodiments above, which will not be repeated here.

An embodiment of the present application also provides a computer readable storage medium. The computer readable storage medium stores a computer program for electronic data interchange, and the computer program enables a computer to perform parts or all of the acts as described for the terminal in the above method embodiments.

An embodiment of the present application also provides a computer readable storage medium. The computer readable storage medium stores a computer program for electronic data interchange, and the computer program enables a computer to execute parts or all of the acts described for the network device in the above method embodiments.

An embodiment of the present application also provides a computer program product. The computer program product includes a non-transitory computer readable storage medium storing a computer program, and the computer program is operable to enable a computer to perform parts or all of the acts as described for the terminal in the above method embodiments. The computer program product may be a software installation package.

An embodiment of the present application also provides a computer program product. The computer program product includes a non-transitory computer readable storage medium storing a computer program, and the computer program is operable to enable a computer to perform parts or all of the acts as described for the network device in the above methods. The computer program product may be a software installation package.

The acts of the methods or algorithms described in combination with disclosed contents of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to a processor such that the processor can read information from the storage medium, and may write information to the storage medium. Of course, the storage medium may be a component of the processor. The processor and the storage medium may be located in an ASIC. In addition, the ASIC may be located in a communication apparatuses such as a terminal and a network device. Of course, the processor and the storage medium may also exist as discrete components in a communication apparatus.

It may be understood that first, second, third, and various numerical numbers involved in the present application are only for convenience of description, and are not intended to limit the scope of the embodiments of the present application. The term "and/or" herein is an association relationship describing associated objects only, indicating that three relationships may exist, for example, A and/or B may indicate three cases: A alone, both A and B, and B alone. In addition, the symbol "/" in this document generally indicates that objects before and after the symbol "/" have an "or" relationship.

It may be understood that in various embodiments of the present application, sizes of sequence numbers of the above various processes do not imply an order of execution, an order of execution of the various processes should be determined through their functions and internal logics, and should not constitute any limitation on implementation processes of the embodiments of the present application.

Those skilled in the art should realize that in one or more examples described above, the functions described in the embodiments of the present application may be implemented in whole or in parts through software, hardware, firmware, or any combination thereof. When the functions described in the embodiments of the present application are implemented through software, these functions may be implemented in whole or in parts in a form of a computer program product. The computer program product includes one or more computer instructions. When the computer program instructions are loaded and executed on a computer, the processes or functions are generated in whole or in parts according to the embodiments of the present application. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer may access, or a data memory device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The invention claimed is:

1. A Physical Uplink Control Channel (PUCCH) transmission method, comprising:
    determining, by a terminal, a target interlace from at least two interlaces, wherein the at least two interlaces are resources configured for the terminal for PUCCH transmission; and
    performing, by the terminal, PUCCH transmission according to the target interlace;
    wherein the determining, by the terminal, the target interlace from at least two interlaces comprises:
    determining, by the terminal, the target interlace from the at least two interlaces according to Orthogonal Cover Code (OCC) configuration information;
    the at least two interlaces comprise a first interlace and a second interlace; and the determining, by the terminal, the target interlace from the at least two interlaces according to the OCC configuration information comprises:
    determining, by the terminal, that the target interlace comprises the second interlace if the first interlace corresponds to the OCC configuration information and the second interlace does not correspond to the OCC configuration information;
    determining, by the terminal, that the target interlace comprises the second interlace if the OCC configuration information comprises an OCC length with a value of 1 corresponding to the first interlace and an OCC length with a value greater than 1 corresponding to the second interlace;
    wherein a PUCCH resource parameter comprises the OCC configuration information; or,
    a PUCCH format 2 parameter and/or a PUCCH format 3 parameter comprise the OCC configuration information;
    the PUCCH resource parameter, the PUCCH format 2 parameter, and the PUCCH format 3 parameter are Radio Resource Control (RRC) configuration parameters sent by a network device.

2. The method according to claim 1, wherein the target interlace is one of the at least two interlaces.

3. The method according to claim 2, further comprising:
    determining, by the terminal, that the target interlace is one interlace according to an information bit size and a maximum transmission code rate of a transmission block in the PUCCH.

4. A terminal, comprising: a processor, a memory, a communication interface, and one or more programs, wherein the one or more programs are stored in the memory and configured to be executed by the processor, and the one or more programs comprise instructions for performing the acts in the method according to claim 1.

5. A computer readable non-transitory storage medium, configured to store a computer program, wherein the computer program enables the computer to perform the method according to claim 1.

6. A Physical Uplink Control Channel (PUCCH) transmission method, comprising:
    configuring, by a network device, at least two interlaces for a terminal, wherein the at least two interlace are resources configured for the terminal for PUCCH transmission; and
    indicating, by the network device, the at least two interlaces to the terminal to enable the terminal to perform PUCCH transmission based on a target interlace determined through the at least two interlaces;
    wherein the at least two interlaces comprise a first interlace and a second interlace; and the method further comprises:
    sending, by the network device, Orthogonal Cover Code (OCC) configuration information to the terminal, wherein if the first interlace corresponds to the OCC configuration information and the second interlace does not correspond to the OCC configuration information, the target interlace comprises the second interlace; if the OCC configuration information comprises an OCC length with a value of 1 corresponding to the first interlace and an OCC length with a value greater than 1 corresponding to the second interlace, the target interlace comprises the second interlace;
    wherein the method further comprises:
    sending, by the network device, a PUCCH resource parameter to the terminal, wherein the PUCCH resource parameter comprises the OCC configuration information; and/or,
    sending, by the network device, a PUCCH format 2 parameter and/or a PUCCH format 3 parameter to the terminal, wherein the PUCCH format 2 parameter and/or the PUCCH format 3 parameter comprise the OCC configuration information;
    wherein the PUCCH resource parameter, the PUCCH format 2 parameter, and the PUCCH format 3 parameter are Radio Resource Control (RRC) configuration parameters sent by the network device.

7. A network device, comprising: a processor, a memory, a communication interface, and one or more programs, wherein the one or more programs are stored in the memory and configured to be executed by the processor, and the one or more programs comprise instructions for performing the acts in the method according to claim 6.

8. A computer readable non-transitory storage medium, configured to store a computer program, wherein the computer program enables the computer to perform the method according to claim 6.

* * * * *